United States Patent
Ambeck-Madsen et al.

(10) Patent No.: US 11,921,922 B2
(45) Date of Patent: Mar. 5, 2024

(54) NEURAL MENU NAVIGATOR AND NAVIGATION METHODS

(71) Applicants: TOYOTA MOTOR EUROPE, Brussels (BE); CAMLIN ITALY S.R.L., Parma (IT)

(72) Inventors: Jonas Ambeck-Madsen, Brussels (BE); Andrea Bellotti, Brussels (BE); Luca Ascari, Parma (IT); Sergey Antopolskiy, Parma (IT); Pietro Avanzini, Parma (IT); Alessia Colucciello, Parma (IT); Anna Marchenkova, Parma (IT); Giovanni Vecchiato, Parma (IT)

(73) Assignees: TOYOTA MOTOR EUROPE, Brussels (BE); CAMLIN ITALY S.R.L., Parma (IT)

( * ) Notice: Subject to any disclaimer, the term of this patent is extended or adjusted under 35 U.S.C. 154(b) by 225 days.

(21) Appl. No.: 17/604,826

(22) PCT Filed: Apr. 19, 2019

(86) PCT No.: PCT/EP2019/060248
§ 371 (c)(1),
(2) Date: Oct. 19, 2021

(87) PCT Pub. No.: WO2020/211958
PCT Pub. Date: Oct. 22, 2020

(65) Prior Publication Data
US 2022/0261080 A1    Aug. 18, 2022

(51) Int. Cl.
*G06F 3/01* (2006.01)
*G06F 3/0482* (2013.01)
*G06F 18/24* (2023.01)

(52) U.S. Cl.
CPC ............ *G06F 3/015* (2013.01); *G06F 3/0482* (2013.01); *G06F 18/24* (2023.01)

(58) Field of Classification Search
USPC ........................................................ 345/156
See application file for complete search history.

(56) References Cited

U.S. PATENT DOCUMENTS

| 8,350,804 B1 | 1/2013 | Moll |
| 9,389,685 B1 | 7/2016 | Pathirage et al. |

(Continued)

FOREIGN PATENT DOCUMENTS

WO    2015/183737 A1    12/2015

OTHER PUBLICATIONS

Dec. 19, 2019 International Search Report issued in International Patent Application No. PCT/EP2019/060248.

*Primary Examiner* — Chineyere D Wills-Burns
(74) *Attorney, Agent, or Firm* — Oliff PLC

(57) ABSTRACT

A system for brain-based digital menu selection includes an acquisition device to obtain one or more electrical signals corresponding to an operator's brain response, a stimulation generation device to generate a first stimulus with one or more target options based on the operator triggering the system, a first database including a first classification model, and processor. The processor receives a first response from the acquisition device corresponding to an operator's brain response to the first stimulus with the one or more target options, determines a probability of intended target, when the probability of intended target option is higher than a predefined confidence threshold value, selecting the intended target option and presenting a second stimulus, or executing a final action, according to the selected target (Continued)

option, and storing the first response and the selected target option in the first database with a classification identifier identifying the operator.

21 Claims, 6 Drawing Sheets

(56) References Cited

U.S. PATENT DOCUMENTS

| | | |
|---|---|---|
| 2011/0289030 A1 | 11/2011 | Lu et al. |
| 2012/0069247 A1 | 3/2012 | Morikawa et al. |
| 2017/0095383 A1 | 4/2017 | Li et al. |
| 2017/0188933 A1* | 7/2017 | Huggins ............... A61B 5/7267 |
| 2017/0359722 A1* | 12/2017 | Folse ...................... G06F 21/51 |
| 2018/0096590 A1* | 4/2018 | Grubis ................... G16H 20/17 |
| 2018/0137560 A1* | 5/2018 | Chopra ................... G06F 9/451 |
| 2018/0314336 A1* | 11/2018 | Forsland ................ G06F 3/017 |
| 2018/0365527 A1* | 12/2018 | Li ........................ G06F 3/04817 |
| 2019/0073029 A1 | 3/2019 | Filatov et al. |
| 2019/0107888 A1* | 4/2019 | Sereshkeh ............. A61B 5/374 |
| 2019/0121431 A1* | 4/2019 | Lee .......................... G06F 3/011 |
| 2019/0307356 A1* | 10/2019 | Sarma .................. A61B 5/6803 |
| 2020/0310599 A1* | 10/2020 | Mukherjee ............ G06F 3/0484 |
| 2021/0081043 A1* | 3/2021 | Li ........................... G06F 3/015 |

* cited by examiner

[Fig. 1]
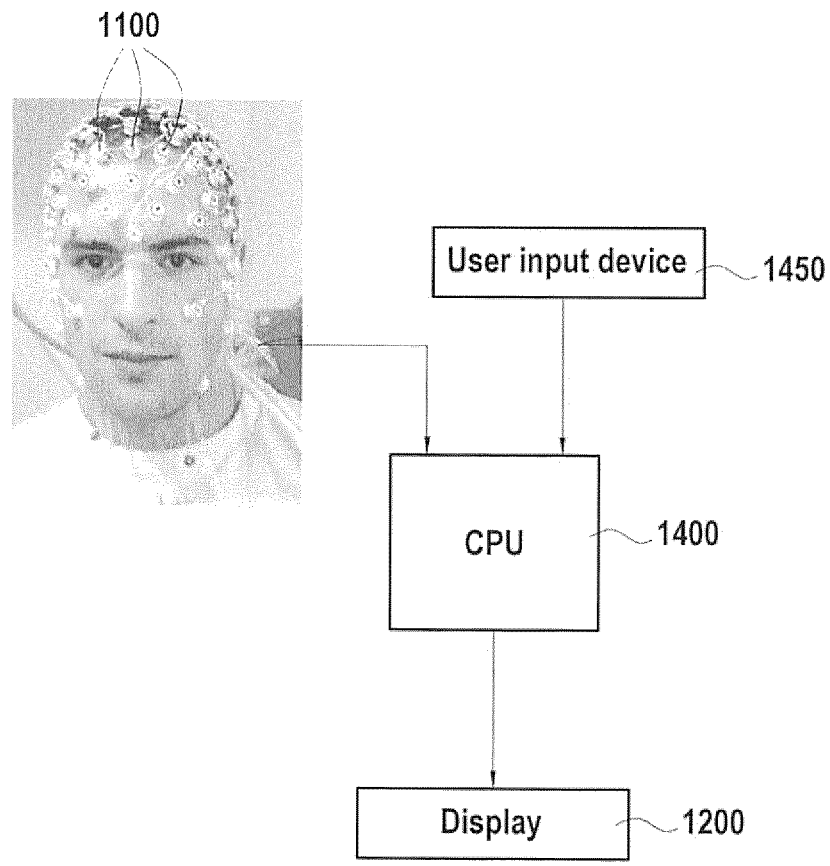
[Fig. 2]
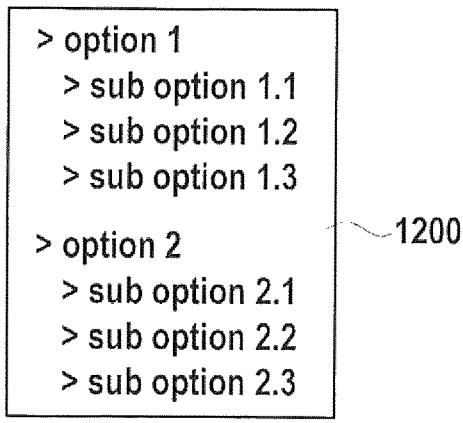

[Fig. 7]
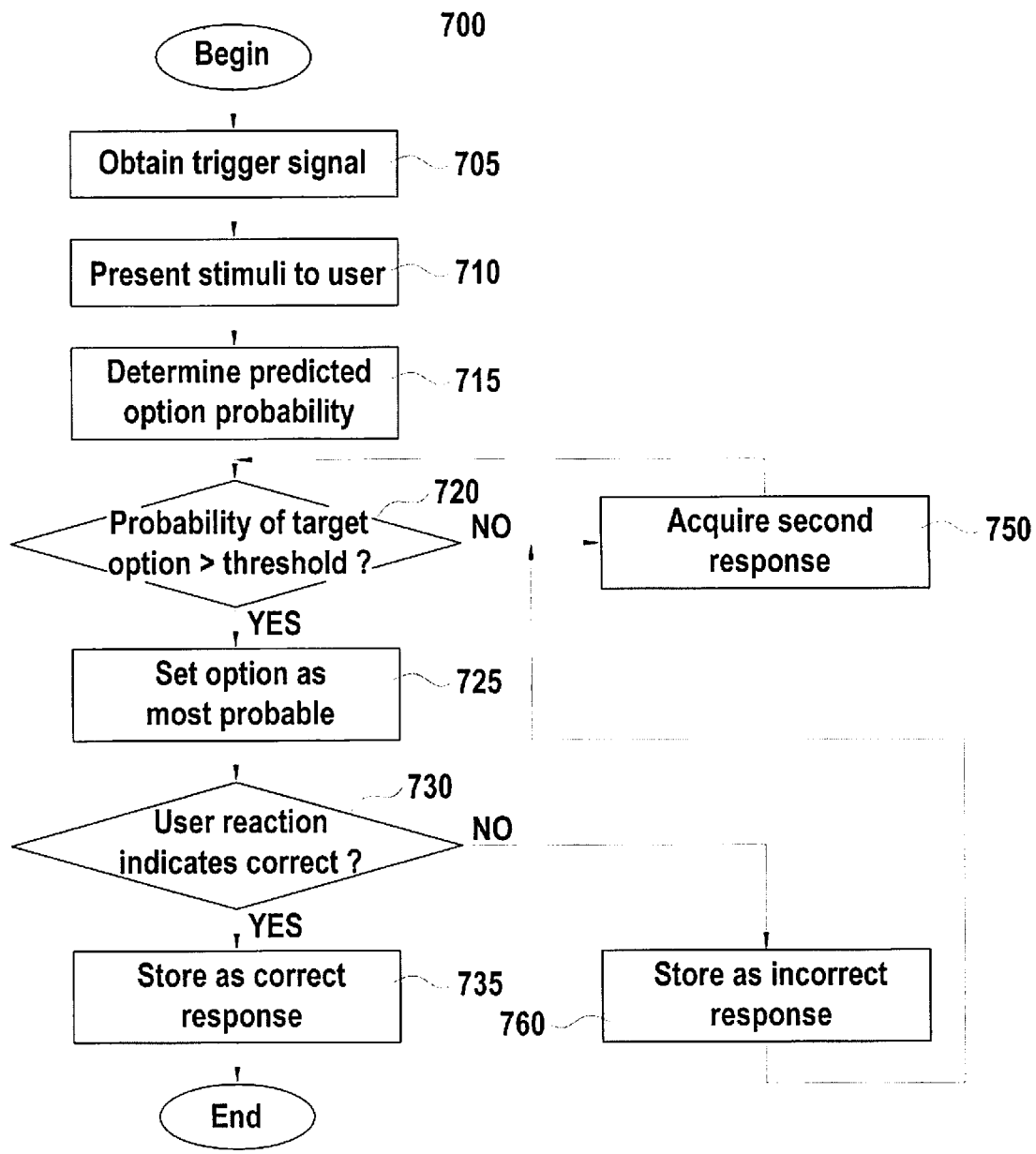

NEURAL MENU NAVIGATOR AND NAVIGATION METHODS

FIELD

The present invention relates to systems and methods for neural menu navigation, and more particularly to an optimized selection mechanism and method for such menus.

BACKGROUND

Brain Computer Interfaces (BCIs) are an active area of development, and BCIs based on simple or subtle neural mechanisms are being created more and more regularly. However, real-world applications of such BCIs is still very limited due to adoption factors such as the remaining manual or semi-manual actions to be performed, and limited throughput (information rate in bit/s).

BCIs generally may be categorized into two main broad families: those based on potentials and those based on modulation of brain rhythms.

Potential-based BCIs utilize time-bound signals that include a specific characterization in space and time, elicited normally in response to external stimuli, for example, event-related potentials (e.g., P300 potential, error-related potential, visually or acoustically evoked potentials, etc.)

Modulation-based BCIs utilize spatial and temporal patterns of synchronizations and desynchronizations of power content of user EEG signal in specific bands, elicited either by mental state (drowsiness, alert, arousal, . . . ) and/or by willingly generated brain activity (e.g., motor imagery).

In addition, the adoption of signals extracted from biopotentials other than EEG (such as Galvanic Skin Response or Heart Rate Variability), or other signals related to user motion (such as gaze trackers, wearable inertial units) may be considered a hybrid-type BCI.

U.S. Pat. No. 9,389,685 discloses a vision based brain computer interface system for performing activities of daily living.

US 2011/289030 discloses methods an systems for classifying brain signals in a BCI.

US 2012/0069247 discloses EEG interface systems, methods, and programs.

US 2017/095383 discloses intelligent wheelchair control methods based on a BCI and automatic driving technology.

SUMMARY

The present inventors have determined that it remains desirable to provide a system providing more accurate selection with reduced user intervention.

Therefore, according to embodiments of the present disclosure, a system for brain-based digital menu selection is provided. The system includes an acquisition device configured to obtain one or more electrical signals corresponding to a brain response of an operator, a stimulation generation device configured to generate and present a first stimulus comprising one or more possible target options to the operator, for example, following an initial system trigger caused by the operator, a first data structure comprising a first classification model, and a processor. The processor is configured to receive a first response from the acquisition device corresponding to a brain response of the operator to the first stimulus comprising the one or more possible target options, determine a probability of intended target option for each of the one or more possible target options based on the first response and the first classification mode, when the probability of intended target option for an intended target option of the one or more possible target options is higher than a predefined confidence threshold value, selecting the intended target option and presenting a second stimulus, or executing a final action, according to the selected target option, and store the first response and the selected target option in the first data structure with a classification identifier identifying the operator.

By providing such a system, it becomes possible to implement a brain operated menu selection system without an initial training step, while still providing accurate selection results for an operator of the system.

In addition, the provided system may be continuously adapted based on brain activity of a particular identified user to further improve the selection prediction decisions made by the system.

Moreover, speed and accuracy of the system may be improved by automatic correction of prediction errors and continuous Electroencephalogram pattern processing associated with specific choices.

The system may include a user input device distinct from the acquisition device, and which is configured to receive one or more manual operator inputs.

The user input device may include at least one of a microphone, an actuator (e.g., a button, knob, tactile element, etc.), and a touch screen, and wherein the user input device is configured to trigger an initial operation of the system.

Prior to a first use of the system by the operator, the first classification model may include a set of pre-learned confidence metrics, and following a first use of the system by the operator, the pre-learned confidence metrics are updated to learned-confidence metrics based on the identifier, the selected option, and the previously determined probability of each of the one or more possible target options.

The processor may be configured such that, when the probability of intended selection for all of the one or more possible target options is lower than the predefined threshold value, a second response from the acquisition device corresponding to the brain response of the operator is acquired, and the probability of intended selection for each of the one or more possible target options is redetermined.

The processor may be configured to determine the probability of error in the selected target option based on a predetermined error probability threshold value and a second classification model.

The second classification model may be configured to access a second database comprising a correctly labeled dataset of target and non-target option selection information linked to the operator.

The second classification model may be trained based on one or more selected target options by the operator.

Prior to a first use of the system by an operator, the predefined confidence threshold value may be set higher than following use of the system by the operator.

The processor may be configured to present at a predetermined frequency, a least-probable target having a probability less than the predetermined confidence threshold value, based on the first response and the first classification model, in lieu of a target option having a probability greater than the predetermined confidence threshold value, receive a third response from at least one of the acquisition device and the user input device in response to the least-probable target, and label and store the third response in the second database as an incorrect target response.

The processor may be configured to, after storing of the third response, present a target option having a probability higher than the predefined confidence threshold value, receive a fourth response from at least one of the acquisition device and the user input device in response to the target option, and label and store the fourth response in the second database as a correct target response.

The processor may be configured to modify the first classification model based on at least one of the third response and the fourth response.

According to further embodiments of the disclosure, a method for brain-based digital menu selection is provided. The method includes acquiring from an acquisition device one or more electrical signals corresponding to a brain response of an operator, generating and presenting, by a stimulation generation device, a first stimulus comprising one or more possible target options to the operator, for example, in response to an initial system trigger caused by the operator, receiving a first response from the acquisition device corresponding to a brain response of the operator to the first stimulus comprising the one or more possible target options, determining a probability of intended target for each of the one or more possible target options based on the first response and the first classification model, and when the probability of intended target option for an intended target option of the one or more possible target options is higher than a predefined confidence threshold value, selecting the intended target option and presenting a second stimulus, or executing a final action, according to the selected target option, and storing the first response and the selected target option in the first database with a classification identifier identifying the operator.

By providing such a method, it becomes possible to implement a brain operated menu selection system without an initial training step, while still providing accurate selection results for an operator of the system.

In addition, the method may allow an implementing system to be continuously adapted based on brain activity of a particular identified user to further improve the selection prediction decisions made by the system.

Moreover, speed and accuracy of an implementing system may be improved by use of the method for automatic correction of prediction errors and continuous Electroencephalogram pattern processing associated with specific choices.

The method may include receiving, from a user input device distinct from the acquisition device, one or more manual operator inputs, wherein at least one of the one or more manual operator inputs is configured to trigger initial execution of the method.

Prior to a first execution of the method, the first classification model may include a set of pre-learned confidence metrics, and wherein following a first use of the system by the operator, the pre-learned confidence metrics may be updated to learned-confidence metrics based on the identifier, the selected option, and the previously determined probability of each of the one or more possible target options.

When the probability of intended selection for all of the one or more possible target options is lower than the predefined threshold value, a second response from the acquisition device corresponding to the brain response of the operator may be acquired, and the probability of intended selection for each of the one or more possible target options is redetermined.

The method may include determining the probability of error in the selected target option based on a predetermined error probability threshold value and a second classification model.

The second classification model may be configured to access a second database comprising a correctly labeled dataset of target and non-target option selection information linked to the operator.

The method may include training the second classification model based on one or more selected target options by the operator.

Prior to a first execution of the method, the predefined confidence threshold value may be set higher than following the first execution.

The method may include presenting at a predetermined frequency, a least-probable target having a probability less than the predetermined confidence threshold value, based on the first response and the first classification model, in lieu of a target option having a probability greater than the predetermined confidence threshold value, receiving a third response from at least one of the acquisition device and a user input device in response to the least-probable target, and labeling and storing the third response in the second database as an incorrect target response.

The method may include, after storing of the third response, presenting a target option having a probability higher than the predefined confidence threshold value, receiving a fourth response from at least one of the acquisition device and the user input device in response to the target option, and labeling and storing the fourth response in the second database as a correct target response.

The method may include modifying the first classification model based on at least one of the third response and the fourth response.

Additional features of the present disclosure include learning and adaptation of the first and second classification models for generalized performance (across populations) with individual, operator targeted, self-adaptation (calibration) on a continuous basis, which provides not only robustness against drifting electrode positioning on the head of an operator, but also the possibility of adding new labels in the first and second classification models for extended functionality.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

BRIEF DESCRIPTION OF THE DRAWINGS

FIG. 1 is a schematic of an exemplary acquisition and selection system for brain-based digital menu selection;

FIG. 2 is a schematic of an exemplary stimulation device including a plurality of menu options for selection by an operator;

FIG. 7 is a flowchart depicting an exemplary method according to embodiments of the disclosure.

DESCRIPTION OF THE EMBODIMENTS

Figure 3:
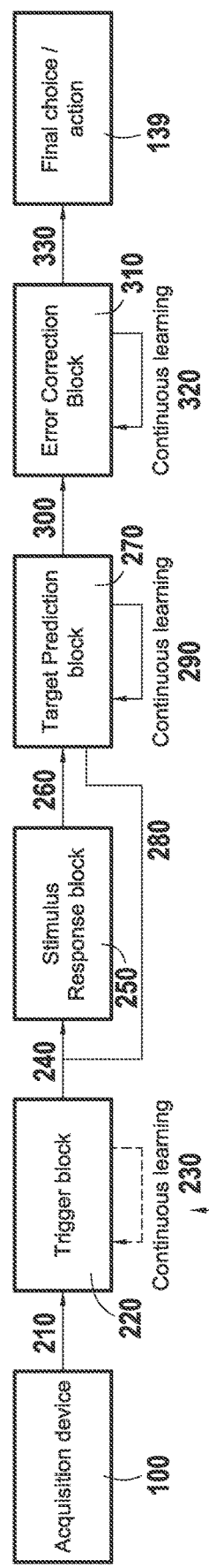
FIG. 3 is a logical block diagram of a high level view of an exemplary system according to embodiments of the present disclosure.

Reference will now be made in detail to exemplary embodiments of the disclosure, examples of which are illustrated in the accompanying drawings. Wherever possible, the same reference numbers will be used throughout the drawings to refer to the same or like parts.

The present disclosure describes embodiments of an adaptive system for digital menu selection with dynamic human modeling of brain signals.

Specifically, in a wireless (or wired depending on the implementation), mobile system (sensor and processor) embodiments of the disclosure enable single repetition of "menu option" (targets) and then selection, eliminate previously required confirmation steps whereby an operator was requested to confirm the systems proposed selection.

Upon reading the disclosure below, one of skill in the art will recognize that numerous concrete implementations of the system described herein can be undertaken. For example, in the automotive context, the system may be implemented for a driver of an automobile to enable hands-free selection of options on, for example, an infotainment system of the vehicle, a navigation system of the vehicle, a cruise control and/or any other driving assistance tool on the vehicle, etc. In the present disclosure, the examples will be described in the automotive context. In addition, following the principle automotive example, other possible concrete implementations will be briefly described.

FIG. 1 is a schematic of an exemplary acquisition and selection system for brain-based digital menu selection. Such a system may include an acquisition device 1100, a stimulation generation device 1200, a processor 1400, and one or more optional user input devices 1450.

Acquisition device 1100 may be any suitable device configured to capture and Encephalographic and/or other trigger information from an operator of the system. For example such acquisition devices typically comprise one or more electrodes (e.g. 1-256 electrodes) each corresponding to a particular capture and transmission channel of the acquisition device 1100.

Encephalographic and trigger information may include for example, one or more blinks of an eye, actuation of user input device 1450 (e.g., button push, voice command, etc.) and/or other device, a voice command, or even a specific brain pattern from acquisition device 1100. For example, an operator of a vehicle underway, may issue a voice command "change music options" resulting in triggering of the stimulation generation device 1200 to provide a menu of options, for example as shown in FIG. 2, corresponding to available music/entertainment options in the vehicle.

Alternatively, or in addition, a user may actuate, for example, a button present on a steering wheel of the vehicle, the button having the same indication of changing musical options being provided by the infotainment system of the vehicle. Such actuation may thereby, trigger operation of the menu system and presentation of one or more stimuli.

Acquisition device 1100 may comprise a structure configured to cause electrodes of acquisition device 1100 to maintain contact with a head surface of an operator in an area surrounding the cranial region of said operator.

Acquisition device 1100 may be configured to transmit signals via a wired connection and/or a wireless connection to CPU 1400, as will be described below.

Examples of such acquisition devices 1100 are readily available in the market, and include, for example, devices by Gtech (e.g. Nautilus), ANT Neuro (e.g., Ego Mylab), and Brain Products (e.g., ActiCHamp), among others.

Alternatively, a custom acquisition device may be implemented based on a desired electrode count, and head shape of an operator. For example, neuroelectrics dry EEG electrodes may be coupled with an OpenBCI Cyton Biosensing Board for collecting raw EEG signals from the EEG electrodes. One of skill will understand that any suitable configuration for acquisition device 1100 may be implemented without departure from the scope of the present disclosure.

Processing of the EEG signals received from acquisition device 1100 may be recorded from, for example, five electrode locations (according to the known 10/20 system): C3, C4, Cz, Pz, Fp1, and referenced to the left earlobe of the operator. The choice for the electrode positions may be made in accordance with the central-parietal distribution of the ERP response, which may be expected as an outcome of "oddball" experiments.

The Fp1 channel may be implemented for ocular artefacts detection, for example, by labelling them such artefacts when a threshold is exceeded Signals and experimental events may be acquired at a sampling rate of, for example, 500 Hz, with the raw EEG signals being saved as streams and then filtered with a bandpass filter with cut off of 0.1 and 30 Hz, to increase the reliability and signal to noise ratio while preserving the relevant physiological information.

Scripts and/or programs may be implemented in any suitable programming language (e.g., Python) to extract events for all recorded channels, using the first 100 ms (e.g., from −100 ms to stimulus onset set to 0) for baseline correction. The resulting events may then be provided as a brain response for purposes of the present disclosure.

A user input device 1450 distinct from acquisition device 1100 may be provided, and may be configured to receive one or more manual operator inputs. For example, user input device 1450 may include at least one of a microphone, an actuator (e.g., a button, knob, tactile element, etc.), and a touch screen.

User input device 1450 may be configured to, among others, obtain an identity of the present operator of the system, via for example voice recognition, and/or other biometric identifiers, or, according to some embodiments, by user information entered using user input device 1450 by the operator (i.e., a logon). One of skill in the art will recognize that any suitable method for obtaining a user identity may be implemented without departing from the scope of the present disclosure.

User input device 1450 may be positioned in any suitable location for actuation by an operator. For example, where an automotive implementation a first user input device 1450 may comprise a button or knob mounted on a steering wheel of the vehicle, while a second user input device 1450 may comprise a microphone mounted within audible range of the operator.

According to some embodiments, user input device 1450 may be configured to trigger an initial operation of the system. For example, where a microphone is provided as one user input device 1450, a driver may speak a command "change destination" to trigger operation of the infotainment/navigation system of the vehicle, and to be provided with one or more stimuli on display 1200 related to navigation options (e.g., select a location, search a location, go home, etc.)

Alternatively, or in addition, an operator may actuate a button corresponding to user input device 1450, the button corresponding to a desire to change entertainment options (e.g., music) in the vehicle. This actuation may thereby trigger operation of the infotainment system, and cause presentation of stimuli on display 1200 (e.g., radio, video, white noise, etc.)

User input device 1450 may provide further functionality for example, an operator of the system may periodically be requested to confirm using user input device 1450, whether the correct selection of an intended target option has been made by the system. Based on a response from the operator to user input device 1450, the brain response obtained from acquisition device 1100 may be labeled at a "ground truth" level, and stored as a ground-truth labeled brain response to a target stimulus. One of skill in the art will understand that a frequency at which the system requests such "ground truth labeling" may be higher an initial operation of the system by an operator, then after significant use of the system were continued learning by the system has enabled greater accuracy and were greater ground truth labeled data is available.

CPU 1400 may be any suitable processor configured to execute instructions, process data, and output information, among other things. For example, CPU 1400 may be comprised by one or more automotive ECUs installed in a vehicle in which the operator is driving. One of skill in the art will understand that a particular hardware configuration of CPU 1400 need not be discussed in the context of the present application.

Display 1200 may constitute stimulation means according to embodiments of the present disclosure, and may include a heads up display, a touchscreen display, a typical LCD display, or any other suitable means for providing information to an operator. For example, such information may be provided tactically based on a vibration pattern provided by stimulation device 1200.

According to some embodiments of the present disclosure, for example in the automotive context, display 1200 may comprise a touchscreen dashboard display, configured to provide stimulus to an operator of the vehicle, and to allow an operator of the vehicle to make choices associated with, for example, entertainment options, navigation options, automated driving options, among others.

As shown in FIG. 2, stimuli displayed on display 1200 may comprise a series of menu options and sub options. One of skill will recognize that this configuration is not limiting, and other means for displaying such stimuli may be implemented. For example, colored icons may be implemented, with each color being associated with a particular menu option, and upon selection by an operator, a new series of colored icons may be presented on display 1200 representing a subset or sub options of the selected icon, as will be described in greater detail below.

According to some embodiments positioning of the colored icons, as described above, may be randomized an initial start-up of a session (i.e. immediately following the trigger by the operator) and subsequently held constant throughout that session. In this way it may be possible to prevent the system from becoming over accustomed to the stimuli positioning in color, thereby possibly resulting in lower P 300 potentials (ERPs) received from acquisition device 1100. In a subsequent session, the colored icons may then again maybe rearranged and colors slightly adjusted as desired. One of skill will recognize that stimulus variation need not be limited to color and may be any suitable attribute. For example, one or more of shape, sound, animation style, etc. may be varied in order to prevent long-term adaptation and disappearance of the ERPs.

Moreover, stimuli displayed or otherwise provided to an operator may be predetermined, or may be dynamically generated by the system based on the context in which the operator and/or system are presently in. For example, where an operator is present in a vehicle that is underway in a tunnel, entertainment options may be presented first in order, prior to options related to navigation, because the tunnel is unlikely to have any possible change in navigation options.

According to another example, presentation of a subset of possible target options may be based on detection of operator sight by means of an eye tracking device and/or detected spatial intention (e.g., from the detection of acoustic evoked potentials from brain) provided in response to sounds presented in different directions. This may allow the possibility of selection among a number of items found by means of m for example, cameras (and computer vision/machine learning) in the detected direction of sight/intention.

In yet a further example, it may be possible to link to an automated driving system present in a vehicle, such that upon detection of an emergency situation (e.g., possible collision), the menu system may be disabled temporarily.

Display 1200 may receive information from CPU 1400 (e.g. stimuli to be displayed), and may, where configured, provide information CPU 1400 based on user options. For example where display 1200 comprises touchscreen display, display 1200 may act as the user input device 1450, as described herein. According to such embodiments, display 1200 may receive a triggering event, e.g., a button actuation, on display 1200 and provide said actuation processor 1200 as manual operator input.

One of skill will recognize that display 1200 may comprise a plurality of displays, and is not limited to one single display. For example, in the automotive context a heads up display in front of an operator of the vehicle may be provided, with corresponding information also displayed on a touchscreen display located on a dashboard of the vehicle. Such a configuration may enable close an operator and a passenger of the vehicle to view and operate the system based on the available options.

Figure 4:
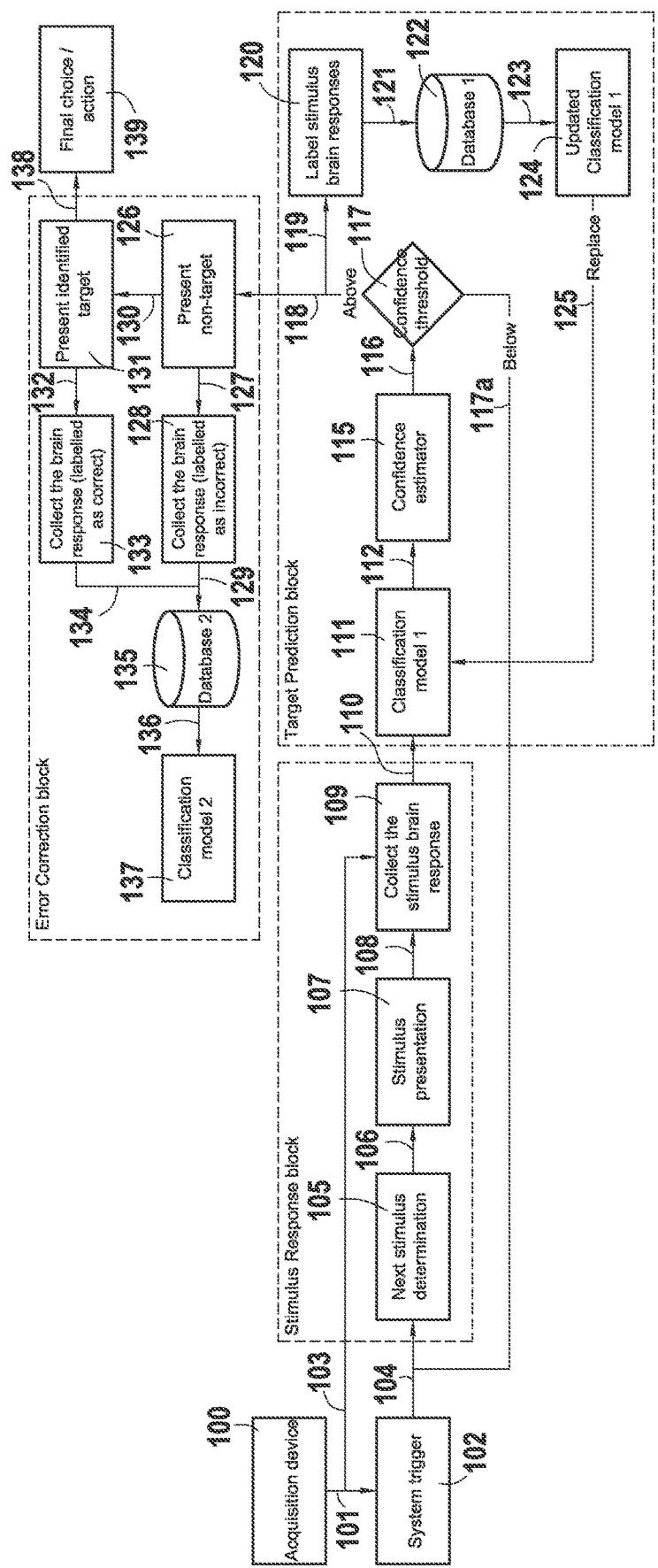
FIG. 4 is a logical depiction of exemplary blocks of FIG. 3 prior to a first use by an operator.
Figure 5:
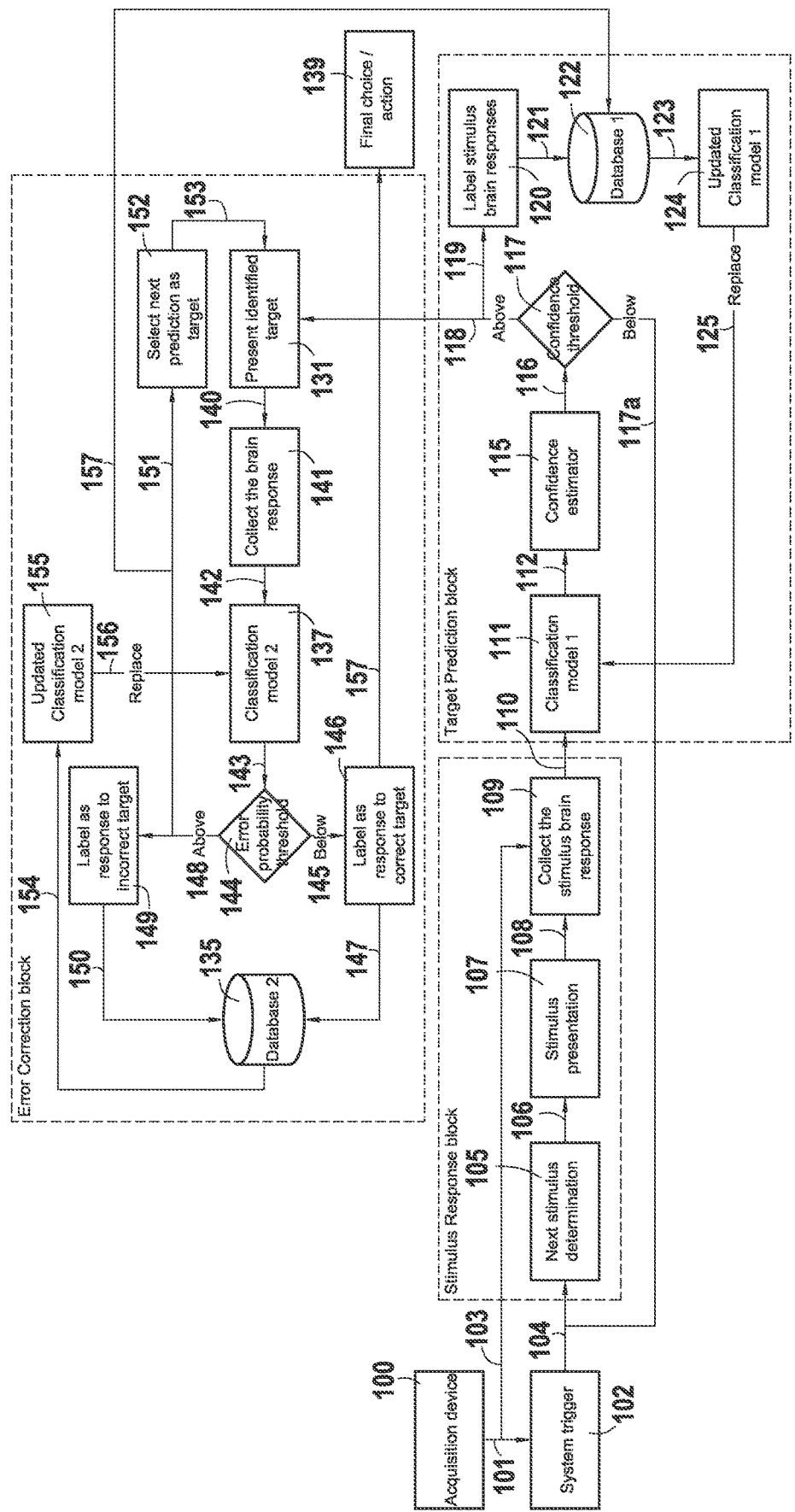
FIG. 5 is a logical depiction of exemplary blocks of FIG. 3 following one or more uses by an operator.
Figure 6:
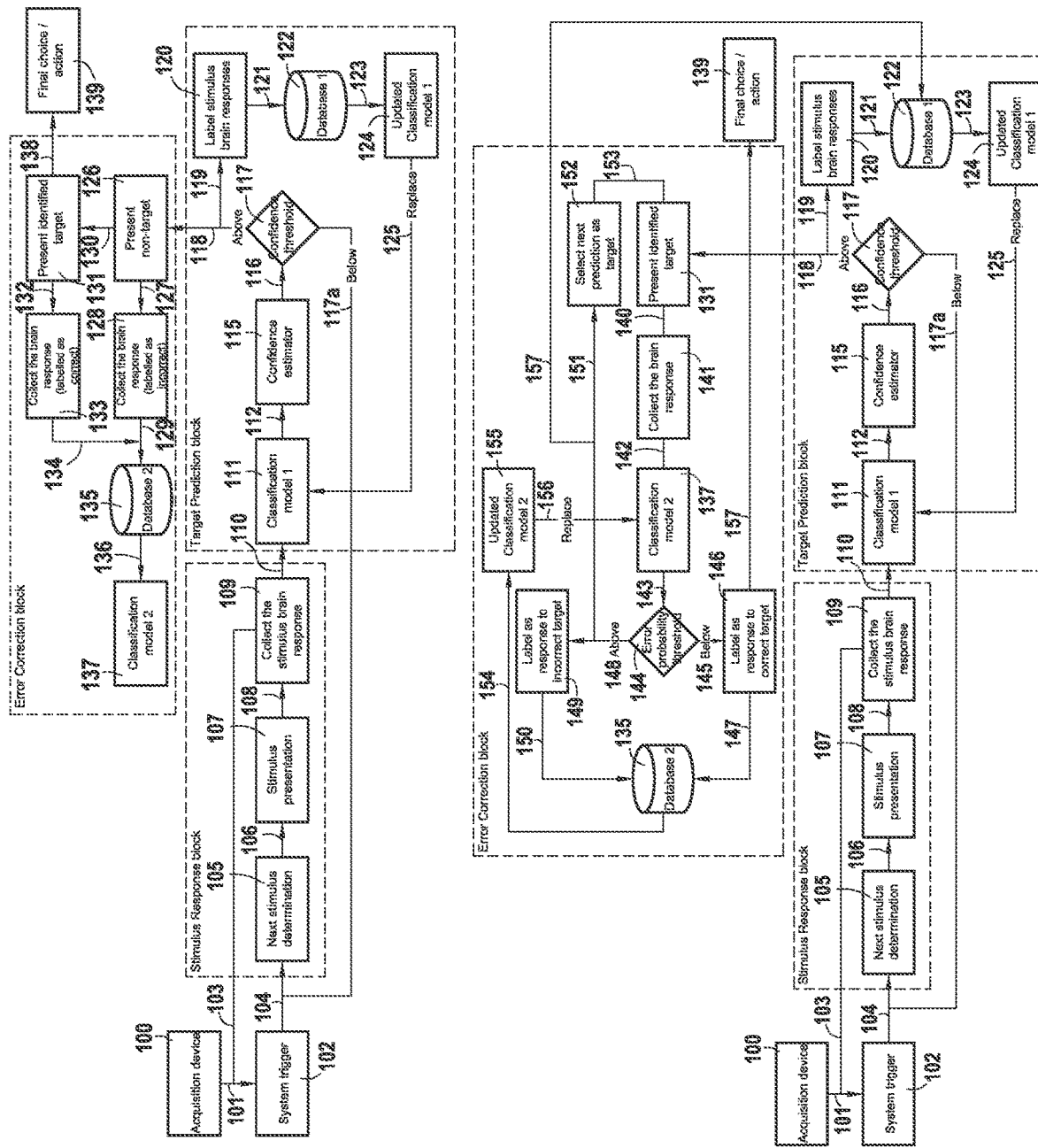
FIG. 6 is a logical depiction of of a complete system showing both pre-use and post use classification models and databases.

FIG. 3 is a logical block diagram of a high level view of an exemplary system according to embodiments of the present disclosure, while FIG. 4 is a logical depiction of exemplary blocks of FIG. 3 prior to a first use by an operator. The blocks of the diagrams correspond generally to modules of software code configured to provide instructions resulting in processor 1400 providing functionality presented by the system. Therefore when described herein, the functionality associated with each block will be described rather than the underlying code itself.

FIG. 7 is a flowchart depicting an exemplary method according to embodiments of the disclosure, and will be discussed in the context of FIGS. 3 and 4 to facilitate understanding.

Once an operator has logged into the system by providing characteristic user information (e.g., biometrics, username/password, etc.) system trigger block 102 may provide functionality allowing the system to be triggered (step 705) by the operator to cause stimulus response block to provide stimuli (step 710) to an operator. For example, system trigger block 102 may receive information from user input device 1450, such as a voice command, button actuation, etc. System trigger block 102 may then cause activation of the system and presentation of a first stimulus comprising one or more target options on display 1200.

Stimulus response block 250 may include a plurality of functional blocks, for example a next stimulus determination block 105, a stimulus presentation block 107, and a stimulus brain response collection block 109, among others. [0087] Next stimulus determination block 105 may be configured to determine which stimulus should be presented to the operator on display 1200, once having actuated the trigger (e.g., via voice command), or made a selection via acquisition device 1100. For example, based on the triggering action of the user and the operator identity, the appropriate stimulus/stimuli may be presented on display 1200, and following selection of a target stimulus based on a first response from the acquisition device 1100 corresponding to a brain response of the operator, a target option from among the stimuli may be selected, and either further stimuli presented or a final action undertaken (e.g. changing of a musical selection) based on the determined target option.

Where a target option results in further sub options (i.e., sub-stimuli) being available for presentation as stimuli, determined stimulus block 107 may be configured to present in a presentation step such stimuli, when such a target option has been determined as the intended target of an operator.

Brain responses to the stimuli acquired from acquisition device 1100 are collected by the brain response collection block 109 for providing to processor 1400 and provision to the first classification model along with the identity of the operator.

A target prediction block 270 comprising a plurality of functional blocks, for example, a first classification model 111, a confidence estimator 115, a response labeler 120, and a first database 122 is to provided. Target prediction block 270 may generally being configured to predict which stimulus the operator desires to select (i.e., the target option) based on a brain response of the operator and the identity of that operator.

First classification model 111 is configured to analyze brain responses received from acquisition device 1100, to a stimulus presentation on display 1200 (e.g., single-trial classification) and to return a probability associated with each stimulus presented, the probability corresponding to a likelihood of a particular stimulus being the intended target option based on the first classification model.

In the context of the present disclosure a first classification model corresponding to a classifier configured to provide a probability indicator associated with a specific target option based on a brain response of an operator, and a second classification model corresponding to a classifier configured to provide a probability of error associated with a specific target option, are disclosed. Each of these models may be implemented as convolutional neural networks (CNNs) in a suitable package (e.g., TensorFlow).

According to some embodiments, a first convolutional layer of 50 filters may be implemented in the CNN, with a rectified linear unit (ReLU) activation function. Dropout probability rate may be decreased with from 0.5 to the 0.1 in all the network blocks of the CNN.

Additionally, the classification layer may be modified to produce a single-trial binary classification (target vs non-target).

In particular, a Stochastic Gradient Descent with Nestorov momentum (momentum $\mu=0.95$), learning rate $\alpha=1e^{-5}$, weight decay ($\lambda=1e^{-6}$) using as loss function the categorical cross-entropy may be used, and batch normalization applied considering batches of size 30. To account for imbalance of the dataset (1/5 ratio of target and non-target trials), a class re-weighting in the fitting phase may be forced by applying a five-fold increase to the weight of the target trials.

The probabilities of each presented stimuli as being the target may be evaluated in the Confidence estimator 115 (step 720) to obtain confidence metrics associated with brain responses stored in the first classification model based on the identifier of the operator.

According to some embodiments initial confidence metrics stored in the first database and associated with brain responses, comprise a pre-learned set of data intended to provide a starting basis for first classification model. These pre-learned confidence metrics may be provided via test subjects, initial training, and other means to provide an enhanced targeted pre-learned set.

Following first and subsequent uses of the system by an operator, the pre-learned confidence metrics are updated to learned confidence metrics based on the operator's identity, selected options in response to a series of stimuli, and the previously system-determined probability of each of the one or more possible target options presented in the stimulus.

If the confidence for a target option is not high enough, i.e., below the confidence threshold 117, the next stimulus is presented 117a starting with next stimulus determination step and continuing along the same sequence as described above until the determined confidence from the first classification model reaches or exceeds the pre-determined confidence threshold (step 720: yes). The current target is thus identified as probable (step 725), i.e. one of the stimuli is assumed to be the target option, and this target is sent to the error correction block.

In the event that none of the probabilities meet or exceed the confidence threshold (step 720: no), the system acquires a second response from acquisition device 1100 (step 750), and re-determines whether the confidence threshold can be met at step 720 with each of the presented stimuli.

All responses to the identified target, which were recorded during a current session may be labelled as responses to the target stimulus, and the remaining responses are labelled as responses to non-target stimuli by the labelling block 120. The thus labelled data structures may be saved in a first database 122, along with an operator identifier, and subsequently used to create an updated first classification model 124. This updated first classification model may then replace the first classification model implemented before first use, or from previous use, of the system, upon the next subsequent use of the system, thus allowing learned adaptation for each specific user.

In other words, each time the system is activated, classification is performed using an updated first classification model 124, which may then be updated again based on a use session, and again for each use session in perpetuity. Thus, the accuracy of the system may be enhanced with each use.

The predefined confidence threshold value may initially (e.g., prior to a first use of the system by an operator) be set higher than following use of the system by the operator. In other words, before a user has ever used the system, the confidence threshold (ranging between 0 and 1) may be set relatively high, such that a prediction probability determined by the system, must be higher in order to meet the threshold.

However, as the system learns from the operator, and accumulates brain responses to both intended target an incorrect target options as the stimuli are presented, the confidence threshold may be reduced based on the fact that the system will become more accurate based on learning performed over the course of each session. For example, a first threshold may be set at 0.95, but after several hundred selections by a user this confidence threshold may be reduced to a value of 0.5 or even 0.4, as the system becomes more confident in its ability to predict how the brain response of the current operator reacts to particular stimuli.

According to some embodiments, it may be possible to allow two or more settings of the system, based on an operator's tolerance for possible erroneous selection. According to such embodiments, one setting may allow for a high threshold for an operator who prefers few or no errors, while a second setting may be selected with a reduced threshold for an operator who does not mind more active/frequent engagement with the system, in exchange for more rapid initial performance. One of skill in the art will recognize that various additional modifications on this concept may be made without departing from the scope of the present disclosure.

An error correction block 310 may be provided comprising, among others, a second classification model 137, a correct response labeler 133, an incorrect response labeler 128, a non-target presenter 126, and an identified target presenter 131.

Error correction block 310 may be configured to determine the probability of error in a selected target option based on a predetermined error probability threshold value and the second classification model 137. Error correction block 310 therefore, may be configured to correct possible errors introduced by the system (e.g., when the system incorrectly predicts the intended target stimulus).

Using error correction block 310, brain responses received from acquisition device 1100 to the presented identified target 131 may be collected and sent to the second classification model 137. The second classification model may be trained based on one or more selected target options by the operator and/or one or more incorrectly identified target options (e.g., based on an operator response to an incorrect selection by the system.

Second classification model 137 may therefore be configured to return an "error" probability that the system has made an error, and the presented target option was not actually the stimulus option the operator intended. This error probability may be compared to an error probability threshold, and if it is below the threshold, the system assumes that there was no mistake, labels the brain response to this stimulus as a response to the correct and "true" target (step 730: yes), and stores the data along with the operator identifier in a second dedicated database 135 corresponding to the second classification model (step 735). The data in the second database 135 may then be further used to update the second classification model 155 for each operator, to improve accuracy of the system.

When further sub-options result from the determined "true" target, these sub-options may then be presented to the operator via display 1200.

Where the selection results in a final action (e.g., a selected navigation endpoint) the system acts according to the selected option so as to effect the user's desired action (e.g., commands navigation to the desired location)

If, however, the probability that the system made a mistake is greater than the error probability threshold (step 730: no), the system assumes that the target was incorrectly identified. In this case, the brain response to the shown prediction is labelled as a response to an incorrect target and sent to the dedicated second database 135 to be stored along with the operator identifier (step 760). This data may then be further used to update the second classification model 155, for future executions of the system.

The system then selects the next most probable prediction as a target and returns to present a new identified target to the operator, and obtain a new response (step 750).

Additionally, the information that the target was misidentified may also be sent to the first database 122, to be used in the future updates of the first classification model.

During the initial phases of implementation for a new operator, in order to collect properly labelled data from the new user and calibrate the first classification model 111, as noted above, the confidence threshold may be set relatively high, so the system is extremely unlikely to make mistakes and only shows the predicted target when it is correctly identified. Then the brain responses to the stimuli are labelled accordingly, and the first classification model can be updated.

However, one problem that occurs is a lack of responses to inevitable errors made by the system, particularly early in use, these errors being desirable for calibration of the error correction block and the training of the second classification model 137 for the current user.

In order to alleviate the lack of errors at early usage, an interleaved, relatively infrequent, presentation of the stimulus identified by the target prediction block 270 to be the least probable target (a "non-target") may be made to the user instead of the most probable target.

After collecting the brain response to the non-target and labelling it as a response to an incorrect target, the system then may present the actually identified target and activate the Final choice/action depending on the action associated with the option. The subsequent brain response to the identified target is also collected and labelled as a response to the correct target, and together with the response to the non-target is saved in the second dedicated database 135. In this way, a properly labelled dataset for the new user can be collected and used to update and refine the second classification model 155.

When calibration of the second classification model reaches a high performance metric (for instance, a high cross-validation index), the confidence threshold may be automatically lowered in order to optimize confidence/time ratio. In other words, second classification model may be optimized until it reaches a performance based on the available data that is sufficiently high, as defined subjectively at time of implementation. In particular, cross validation may include subdividing the available data in a number N of blocks (e.g., 5), optimizing the model on all but one block, and testing the performance on the one block not optimized. This is then repeated N times to take into account each block as a un-optimized block for testing the performance. The overall performance is then taken as the average of the performances obtained over all N evaluations.

By implementing embodiments of the present disclosure, it becomes possible to create adaptable and training-free BCI-based selection mechanisms, without the use of explicit user feedback. Further, the systems and methods can be used in a variety of settings and applications As the system must work for the new users out of the box, the pre-learned confidence metrics, from pre-trained models can be used. These pre-trained models can then be continuously updated for any particular operator, without explicit user feedback (e.g. confirmation), thereby eliminating or at least reducing user training of any kind.

Further Implement continuous learning to allow adaptation of the different aspects of the system (stimulus response classification model, error correction classification model, stimulus presentation mode, etc) to the specific user and day-to-day changes of the brain signals Moreover, it becomes possible to implement single trial classification to dynamically determine optimal number of stimuli presentations to maximize confidence/time ratio Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

For example, embodiments of the disclosure may enable the selection of the spatial direction of attention based on an auditory signal rendered at the operator's ears as coming from a specific direction. The auditory stimuli are generated in the Stimulus Response Block and rendered through a series of loudspeakers or a headset so that they appear as coming from different directions around the user; target prediction block recognizes the direction desired by the user analysing the brain waves captured by the acquisition device. Such embodiment could be used, for instance, inside a vehicle, or to communicate the desired locomotion direction for a mobile teleoperated robot or a wheelchair, for example.

According to another implementation, an interaction selector could be provided. The acquisition device may be doubled using for example, one or more cameras to acquire images of the surrounding; an object classifier may then used to identify the objects with which the user might wish to interact. An identifier can be used to extract the possible interaction modalities with such objects: for instance, a drinking glass on a table could be selected by the user to move it, to fill it, or to drink from it. These affordances are identified by the menu navigator system and shown as icons (static or dynamic) to the user together with the objects or as a second level of menu, depending on their number.

The visual stimuli may be dynamically generated by the system, on the basis of what is recognized by the camera, for example.

According to still further implementations, a needs menu navigator for a patient being treated may be implemented.

Embodiments of the disclosure may be used to enable communication between a patient with temporary or permanent reduced mobility (a locked-in or a paralyzed patient) and their caregivers (such as nurses in a hospital wing). On a display 1200 in front of the patient, icons or other visual representations corresponding to states or needs of the patient may be shown and can thus be activated by the patient autonomously. For instance, icons representing hunger, thirst, climatic discomfort, physiological needs could be shown. The immobile patient could select such options using acquisition device 1100 and the resulting selection be sent to the treating nurse/doctor/provider.

It is intended that the specification and examples be considered as exemplary only, with a true scope of the disclosure being indicated by the following claims.

The invention claimed is:

1. A system for brain-based digital menu selection, comprising:
    an acquisition device configured to obtain one or more electrical signals corresponding to a brain response of an operator;
    a stimulation generation device configured to generate and present a first stimulus comprising one or more possible target options to the operator;
    a first database comprising a first classification model; and
    a processor configured to:
        receive a first response from the acquisition device corresponding to a brain response of the operator to the first stimulus comprising the one or more possible target options,
        determine a probability, for each of the one or more possible target options, that the target option is an intended target option based on the first response and the first classification model,
        when the probability of a first target option of the one or more possible target options is higher than a predefined confidence threshold value, select the first target option and present a second stimulus, or execute a final action, according to the first target option,
        store the first response and the first target option in the first database with a classification identifier identifying the operator, and
        determine a probability of error in the first target option based on a predetermined error probability threshold value and a second classification model.

2. The system according to claim 1, comprising a user input device distinct from the acquisition device, and configured to receive one or more manual operator inputs.

3. The system according to claim 2, wherein the user input device comprises at least one of a microphone, an actuator, and a touch screen, and wherein the user input device is configured to trigger operation of the system.

4. The system according to claim 1, wherein prior to a first use of the system by the operator, the first classification model comprises a set of pre-learned confidence metrics, and wherein
    following a first use of the system by the operator, the pre-learned confidence metrics are updated to learned-confidence metrics based on the classification identifier, the first target option, anda previously determined probability of each of the one or more possible target options.

5. The system according to claim 1, wherein
    the processor is configured such that, when the probability that the target option is the intended target option for all of the one or more possible target options is lower than the predefined confidence threshold value, a second response from the acquisition device corresponding to the brain response of the operator is acquired, and the probability for each of the one or more possible target options being the intended target option is redetermined.

6. The system according to claim 1, wherein the second classification model is configured to access a second database comprising a correctly labeled dataset of target and non-target option selection information linked to the operator.

7. The system according to claim 6, wherein the second classification model is trained based on one or more selected target options by the operator.

8. The system according to claim 6, wherein the processor is configured to:
    present at a predetermined frequency, a least-probable target option having a probability less than the predefined confidence threshold value, based on the first response and the first classification model, in lieu of the first target option;

receive a third response from at least one of the acquisition device and a user input device in response to presenting the least-probable target; and label and store the third response in the second database as an incorrect target response.

9. The system according to claim 8, wherein the processor is configured to, after storing of the third response, present the first target option;

receive a fourth response from at least one of the acquisition device and the user input device in response to presenting the first target option; and label and store the fourth response in the second database as a correct target response.

10. The system according to claim 9, wherein the processor is configured to modify the first classification model based on at least one of the third response and the fourth response.

11. The system according to claim 1, wherein, prior to a first use of the system by an operator, the predefined confidence threshold value is set higher than following use of the system by the operator.

12. A method for brain-based digital menu selection, comprising:

acquiring from an acquisition device one or more electrical signals corresponding to a brain response of an operator;

generating and presenting, by a stimulation generation device, a first stimulus comprising one or more possible target options to the operator;

receiving a first response from the acquisition device corresponding to a brain response of the operator to the first stimulus comprising the one or more possible target options;

determining a probability, for each of the one or more possible target options, that the target option is an intended target option based on the first response and a first classification model included in a first database;

when the probability of a first target option of the one or more possible target options is higher than a predefined confidence threshold value, selecting the first target option and presenting a second stimulus, or executing a final action, according to the first target option;

storing the first response and the first target option in the first database with a classification identifier identifying the operator; and determining a probability of error in the first target option based on a predetermined error probability threshold value and a second classification model.

13. The method according to claim 12, comprising receiving, from a user input device distinct from the acquisition device, one or more manual operator inputs, wherein at least one of the one or more manual operator inputs is configured to trigger execution of the method.

14. The method according to claim 12, wherein prior to a first execution of the method, the first classification model comprises a set of pre-learned confidence metrics, and wherein following a first use of the method by the operator, the pre-learned confidence metrics are updated to learned-confidence metrics based on the classification identifier, the first target option, and a previously determined probability of each of the one or more possible target options.

15. The method according to claim 12, wherein, when the probability that the target option is the intended target option for all of the one or more possible target options is lower than the predefined confidence threshold value, a second response from the acquisition device corresponding to the brain response of the operator is acquired, and the probability for each of the one or more possible target options being the intended target option is redetermined.

16. The method according to claim 12, wherein the second classification model is configured to access a second database comprising a correctly labeled dataset of target and non-target option selection information linked to the operator.

17. The method according to claim 16, comprising training the second classification model based on one or more selected target options by the operator.

18. The method according to claim 16, comprising:

presenting at a predetermined frequency, a least-probable target option having a probability less than the predefined confidence threshold value, based on the first response and the first classification model, in lieu of the first target option;

receiving a third response from at least one of the acquisition device and a user input device in response to presenting the least-probable target; and labeling and storing the third response in the second database as an incorrect target response.

19. The method according to claim 18, comprising, after storing of the third response, presenting the first target option;

receiving a fourth response from at least one of the acquisition device and the user input device in response to presenting the first target option; and labeling and storing the fourth response in the second database as a correct target response.

20. The method according to claim 19, comprising modifying the first classification model based on at least one of the third response and the fourth response.

21. The method according to claim 12, wherein, prior to a first execution of the method, the predefined confidence threshold value is set higher than following execution of the method.

* * * * *